Feb. 6, 1951     D. C. SALATIN     2,540,556
COMBINED SPRINKLER AND HOSE REEL
Filed Jan. 26, 1948
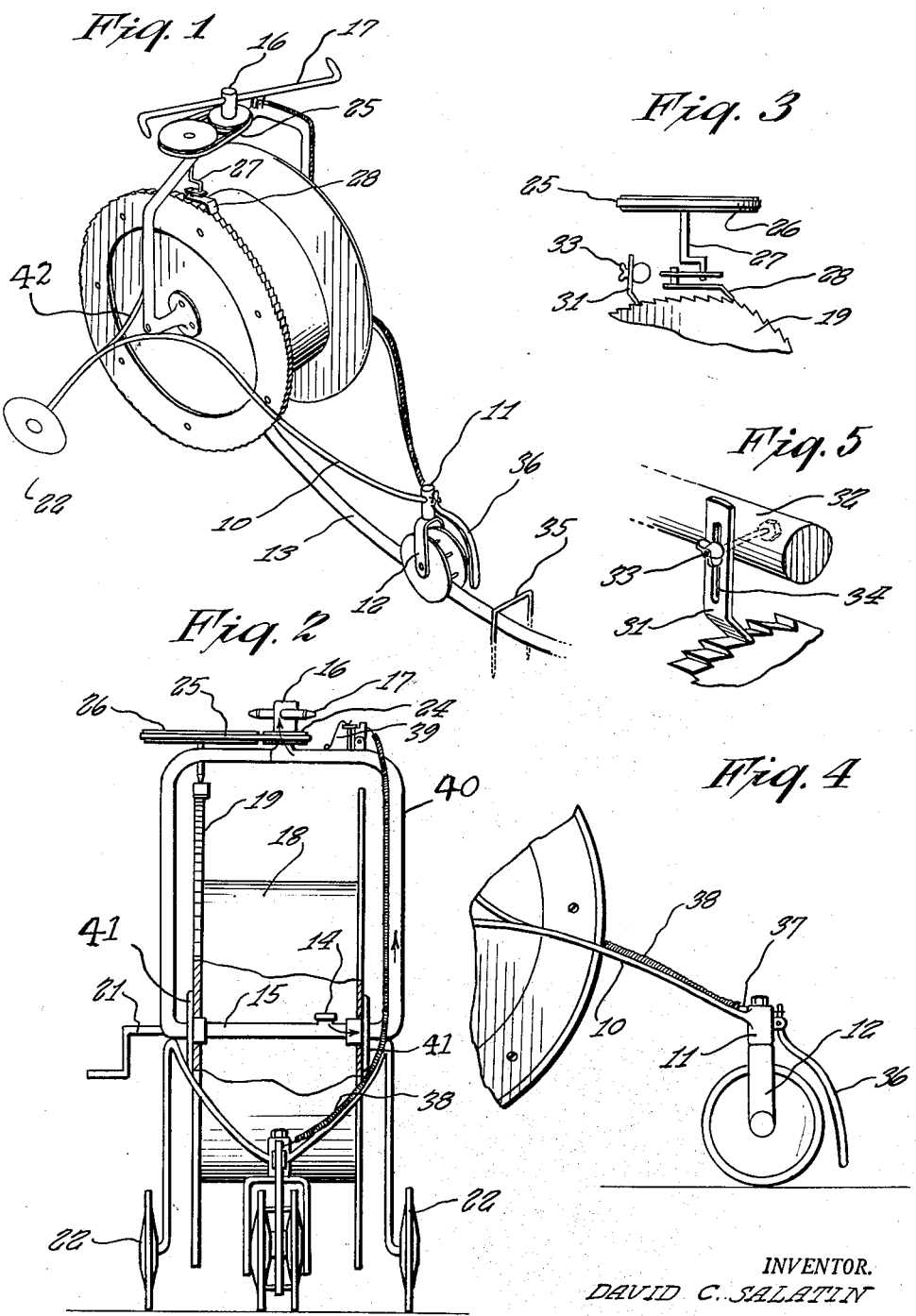
INVENTOR.
DAVID C. SALATIN
BY
Carl Miller
ATTORNEY Patented Feb. 6, 1951

2,540,556

UNITED STATES PATENT OFFICE 2,540,556

COMBINED SPRINKLER AND HOSE REEL

David C. Salatin, Anderson, Ind.

Application January 26, 1948, Serial No. 4,397

2 Claims. (Cl. 299—53)

This invention relates to a combined lawn sprinkler and hose reel.

It is an object of the present invention to provide a combined lawn sprinkler and hose reel wherein the power obtained from the water jets in the sprinkler arms will cause the reel to turn and coil the hose on same, thus resulting in a pulling action upon the hose causing the sprinkler to move across the lawn thereby changing it automatically, and wherein there is a stop element which will be engaged by an arm which will operate upon a wire to close a valve on the mechanism to shut off the water and stop the advancement of the reel and sprinkler over the lawn.

Other objects of the present invention are to provide a combined lawn sprinkler and hose reel which is of simple construction, automatic in operation, a permanent storage for hose, inexpensive to manufacture, of light weight, durable and compact and easy to set up.

For other objects and for a better understanding of the invention, reference may be had to the following detailed description taken in connection with the accompanying drawing, in which:

Fig. 1 is a perspective view of my combined lawn sprinkler and hose reel.

Fig. 2 is a front elevational view of the combined sprinkler and hose reel with portions broken away to show the interior of the reel.

Fig. 3 is a fragmentary side elevational view of the operating mechanism for advancing the reel.

Fig. 4 is a fragmentary side elevational view of the third wheel, the frame, and the reel.

Fig. 5 is a fragmentary perspective view showing the retaining pawl for the reel ratchet.

Referring now to the figures, 10 represents a light frame having a vertically extending post 11 on which there is pivoted a caster wheel or guide 12 through which hose 13 is extended. This hose can be secured to a coupling portion 14 of a central pipe 15 which rotates with the reel 18 on journal flanges 41 connecting the central pipe 15 with vertical pipe 40 which conducts the water upwardly along line of arrows to a rotary sprinkler head 16 having sprinkler arms 17 extending from the same. The reel 18 has central pipe 15 as an axle and will carry the hose. The side of the reel has a ratchet gear 19. A crank 21 extends through the side of the pipe to turn the reel by hand at times when it is desired to fill up the reel 18 with the hose.

The frame 10 extends rearwardly and is curved downwardly to facilitate attachment of the rear wheels 22. A brace 42 strengthens vertical member 40. The frame is preferably made of bent rod or tubing and is supported by the three wheels.

On the sprinkler head 16 is a pulley 24 which is connected by a rubber belt 25 to a large pulley 26 which rotates a crank 27 which has a ratchet 28 thereon engageable with the teeth of the ratchet wheel 19 so that upon every revolution of the crank 27 the ratchet wheel will be stepped around and the hose 13 will be wound upon the reel 18.

Rearwardly of the ratchet 28 is a holding pawl 31 which is adjustably connected to a rod portion 32 and retained in a vertically adjusted position by a wing nut 33. The pawl 31 has an elongated slot 34 to permit the adjustment of the pawl vertically. If it is desired to free the reel for rotation in a direction toward the pawl 34, the pawl can be raised and the wing nut tightened to retain the pawl free of the ratchet wheel 19.

In operation, the reel is extended across the lawn to release the hose. A stop pin or wicket 35 is placed over the hose and as the reel travels toward the wicket an arm 36 will engage the wicket so as to pull on a wire 37 extended through a flexible tubing 38 and connected with a valve device 39 so as to shut off the flow of water to the sprinkler head 16. Upon shutting off the flow of water, the sprinkler head 16 will cease to turn and accordingly the movement of the reel across the lawn will be stopped.

While various changes may be made in the detail construction, it shall be understood that such changes shall be within the spirit and scope of the present invention as defined by the appended claims.

Having thus set forth and disclosed the nature of my invention, what is claimed is:

1. A combined lawn sprinkler and hose reel comprising a carriage frame, a reel journaled on the carriage frame, a pipe extending upwardly from the frame and adapted to have a hose connected to the same to supply water to the pipe, a sprinkler head on the pipe, a drive connection between the sprinkler head and the reel whereby to effect the winding up of a hose on the reel as the sprinkler head is rotated, a crank handle on the reel journal for manually rotating the reel to wind the hose thereon, said drive connection comprising a pulley on the head, a crank extending from the frame, a pulley on the crank, and a pulley belt extending between the pulleys to effect a driving operation of the crank, a ratchet on the crank, a ratchet wheel on the reel and an adjustable holding pawl extending from the frame to prevent the reverse rotation of the ratchet wheel and reel.

2. A combined lawn sprinkler and hose reel comprising a carriage frame, a reel journaled on the carriage frame, a pipe extending upwardly from the frame and adapted to have a hose connected to the same to supply water to the pipe, a sprinkler head on the pipe, a drive connection between the sprinkler head and the reel whereby to effect the winding up of a hose on the reel as the sprinkler head is rotated, a crank handle on the reel journal for manually rotating the reel to wind the hose thereon, two spaced rear wheels on the frame and a single front wheel, a valve in said pipe, an arm pivoted on the frame adjacent the front wheel, a connection between the arm and valve and said arm adapted to be engaged with a ground-anchored stop to effect pivotal movement thereof for closing said valve.

DAVID C. SALATIN.

REFERENCES CITED

The following references are of record in the file of this patent:

UNITED STATES PATENTS

| Number | Name | Date |
|---|---|---|
| 1,658,202 | Jones | Feb. 7, 1928 |
| 1,919,703 | Nielsen | July 25, 1933 |
| 2,096,225 | Crawford | Oct. 19, 1937 |